Patented Sept. 7, 1937

2,092,056

UNITED STATES PATENT OFFICE 2,092,056

CONDENSATION PRODUCTS

Gustavus J. Esselen, Swampscott, Mass., assignor to The Fiberloid Corporation, Indian Orchard, Mass., a corporation of Massachusetts No Drawing. Application April 23, 1935,
Serial No. 17,833

8 Claims. (Cl. 106—22)

The present invention relates to a tough rubbery substance, ordinarily transparent, having physical properties unlike any other substance known to me. The material embodying the invention may be made in a great variety of shapes and forms and colors and is useful for many purposes, for instance as a substitute for rubber sheeting; as a substitute for celluloid or cellulose ester plastics, particularly where pliability and strength are required, as in the side curtains for automobiles; as a component for re-enforcing safety or laminated glass; as a wrapping material, when made in thin sheets of one-thousandth of an inch or thereabouts in thickness; as bottle caps applied over the cork and neck of a bottle; and as a rubbery thread.

The material is characterized by peculiar physical properties, for instance, when made in a thin sheet about 20/1000 of an inch thick and with a considerable amount of phthalic acid esters, it is soft and pliable, resists tearing strains to a remarkable degree even when a nick or cut is started in the edge, and is very elastic, i. e. capable of elongation under tension. Apparently, also little or no permanent elongation takes place even when stretched approximately to the breaking point and the stress strain curves of the material are unusual.

My present invention is based on the discovery that certain condensation products of formaldehyde with hydrolized polymerized vinyl acetate may be mixed with dimethyl phthalate and with certain other phthalic acid esters or mixtures of esters and that the dimethyl phthalate with or without other phthalic acid esters will when used in certain proportions have an effect on the strength, toughness and flexibility of the material which is not produced by the other phthalic acid esters when used alone or in combination. For some unknown reason, dimethyl phthalate, and to a much lesser extent diethyl and dibutyl phthalate, has an important modifying effect on the physical properties of the condensation products in question, and further that when certain proportions of dimethyl phthalate are employed, certain other phthalic acid esters can be used in combination with the dimethyl phthalate with unexpected and satisfactory results.

It will be understood, of course, that the amount of the total addition substances used and the proportions of the particular phthalic acid esters used to make up the addition substance will be chosen in accordance with the physical properties required in view of the use to which the final material is to be put.

In practice I find that phthalic acid ester in proportions of from approximately 5 parts upward of the ester to 100 parts of the condensation products may be employed. Of course, this may be wholly dimethyl phthalate if desired. Even amounts as little as 5 or 10 parts have an appreciable effect on the properties of the final product. If it is desired to make what is commonly known as a sandwich material for laminated glass, a satisfactory material of very great toughness and strength and a high degree of flexibility may be obtained by using 60 parts of phthalic acid ester to each 100 parts of the condensation product and the phthalic acid ester may be a mixture of dimethyl phthalate and dibutyl phthalate in equal parts.

The basic material employed will be a condensation product of formaldehyde and hydrolized polymerized vinyl acetate but the degree both of hydrolization and polymerization may be varied within wide limits. I find that the toughness and strength of the final material increases both with the degree of polymerization of the vinyl acetate as indicated by its viscosity and also with the degree of hydrolization.

The following examples are given by way of illustration of the procedure and materials which may be employed.

Example 1.—A sandwich material for use in laminated glass (1) 100 pounds of the condensation product of formaldehyde with hydrolized, polymerized vinyl acetate of 15 viscosity and having about 90% of the acetate groups hydrolized off.
(2) 30 pounds dimethyl phthalate.
(3) 30 pounds dibutyl phthalate.

The above ingredients can be combined by mixing in a mixer preferably in the presence of a volatile common solvent, for instance, dioxan, in amount sufficient to give the desired working properties in the mixer. The mixing is done at room temperature or somewhat higher depending on the amount and character of the solvent employed.

Example 2.—A very hard material.

(1) 100 pounds of the condensation product of formaldehyde with hydrolized, polymerized vinyl acetate, viscosity 15, 90% of the acetate groups hydrolized off.
(2) 4 pounds dimethyl phthalate.
(3) 8 pounds dibutyl phthalate.

These materials are mixed as described under Example 1.

Example 3.—A medium hard celluloid-like material fairly pliable and very tough.

(1) 100 pounds of the condensation product of formaldehyde with hydrolized, polymerized vinyl acetate, of the same viscosity and degree of hydrolization; and (2) 30 pounds dimethyl phthalate.

Materials to be mixed as described under Example 1.

*Example 4.*—A soft limp tough material.

(1) 100 pounds of the condensation product of formaldehyde with hydrolized, polymerized vinyl acetate of the same viscosity and degree of hydrolization.

(2) 45 pounds dimethyl phthalate.

(3) 45 pounds dibutyl phthalate.

Materials to be mixed as described under Example 1.

A condensation product of formaldehyde with hydrolized, polymerized vinyl acetate having other degrees of viscosity and polymerization may be employed if preferred but it is to be borne in mind that the product becomes somewhat softer and more flabby and can be torn more readily with vinyl acetate of lower viscosity while the product loses somewhat in strength with lower degrees of hydrolysis.

I have found that it is practical to use polymerized vinyl acetate having viscosity as high as 45, 90% of the acetate groups of which have been hydrolized off and replaced by formaldehyde and that this material produces a final product which is extraordinarily strong and tough.

I claim:

1. The novel composition of matter comprising a condensation product of formaldehyde with hydrolized polymerized vinyl acetate, the same being mixed with a mixture of dimethyl phthalate and another ester of phthalic acid in the proportions of 30 to 90 parts of said mixture to 100 parts of the condensation product.

2. The novel composition of matter which is pliable and rubbery and comprises a condensation product of formaldehyde with hydrolized polymerized vinyl acetate, the same being mixed with a mixture of dimethyl phthalate and another ester of phthalic acid in the proportions of about 60 parts of said mixture to 100 parts of the condensation product.

3. The novel composition of matter which is pliable and rubbery and comprises a condensation product of formaldehyde with hydrolized polymerized vinyl acetate, the same being mixed with a mixture of dimethyl phthalate and another ester of phthalic acid in about equal parts, 60 parts of said mixture being used to 100 parts of the condensation product.

4. The novel composition of matter comprising a condensation product of formaldehyde with hydrolized polymerized vinyl acetate, the same being mixed with a mixture of dimethyl phthalate and dibutyl phthalate from 30 up to 90 parts of said mixture being used to 100 parts of the condensation product.

5. The novel composition of matter comprising a condensation product of formaldehyde with hydrolized polymerized vinyl acetate, the same being mixed with a mixture of dimethyl phthalate and dibutyl phthalate in equal parts, from 30 up to 90 parts of said mixture being used to 100 parts of the condensation product.

6. The novel composition of matter which is pliable and rubbery and comprises a condensation product of formaldehyde with hydrolized polymerized vinyl acetate, the same being mixed with about 30 parts of dimethyl phthalate and about 30 parts of dibutyl phthalate to each 100 parts of the condensation product.

7. The novel composition of matter comprising a condensation product of formaldehyde and hydrolized polymerized vinyl acetate, the whole being rendered tough, pliable and rubbery by the presence of more than 5% of dimethyl phthalate.

8. The novel composition of matter comprising (1) a condensation product of formaldehyde and hydrolized polymerized vinyl acetate, and (2) a mixture containing substantial amounts of at least 2 phthalates, chosen from the group consisting of dimethyl phthalate, diethyl phthalate and dibutyl phthalate, in the proportion of more than 5 parts of the mixture to 100 parts of the condensation product.

GUSTAVUS J. ESSELEN.